United States Patent [19]

Scheller

[11] Patent Number: 4,562,874

[45] Date of Patent: Jan. 7, 1986

[54] TIRE PRESSURE CONTROL SYSTEM

[75] Inventor: Franz X. Scheller, Weinstadt, Fed. Rep. of Germany

[73] Assignee: Daimler-Benz AG, Fed. Rep. of Germany

[21] Appl. No.: 584,409

[22] Filed: Feb. 28, 1984

[30] Foreign Application Priority Data

Mar. 19, 1983 [DE] Fed. Rep. of Germany ....... 3310052

[51] Int. Cl.$^4$ .................. B60C 29/00; B60C 23/02
[52] U.S. Cl. .................... 152/427; 73/146.5;
73/146.8; 137/229; 137/557; 137/630.14;
137/871; 141/95; 200/61.25; 200/83 Q; 340/58;
377/21
[58] Field of Search .......... 152/427, 428, 415, 330 R;
73/146.8, 146.5; 200/61.22, 61.25, 83 Q;
340/58; 377/19, 21; 137/229, 557, 630, 14, 871;
141/94, 95, 96

[56] References Cited

U.S. PATENT DOCUMENTS

| 2,658,119 | 11/1953 | Jacobus | 200/61.25 |
| 2,669,617 | 2/1954 | Sletten et al. | 200/61.25 |
| 3,268,678 | 8/1966 | James | 200/61.25 X |
| 4,117,281 | 9/1978 | Leimbach | 200/61.25 |

Primary Examiner—Edward Kimlin
Assistant Examiner—Thomas Bokan
Attorney, Agent, or Firm—Craig and Burns

[57] ABSTRACT

A tire pressure control system having a pressure switch installed in a rim, which pressure switch, as part of a tuned circuit, damps, across an air gap, an HF transmitter, installed in a wheel web and having downstream analysis electronics, the pressure switch having a diaphragm pressure cell with a reference pressure, the diaphragm of which reference cell is subjected on one side to the reference pressure and on the other side to the tire pressure. A valve installed in the pressure switch makes it possible to adjust the reference pressure so that, when filling the tire, the desired tire pressure is simultaneously retained as the new reference pressure in the diaphragm pressure cell for the tire pressure control system.

18 Claims, 3 Drawing Figures

TIRE PRESSURE CONTROL SYSTEM

The invention concerns a tire pressure control system with a pressure switch installed in a rim, which pressure switch, as part of a tuned circuit, damps, across an air gap, an HF transmitter, installed in a wheel web and having downstream analysis electronics, the pressure switch consisting in particular of a support body having a diaphragm pressure cell with a reference pressure located within and having a filling connection, the diaphragm of the pressure cell being subjected on one side to the reference pressure and on the other side to the tire pressure and being effectively connected to a contact switch which is part of the tuned circuit and is also located in the support body.

Known tire pressure control systems of this type ("Entwicklungslinien in Kraftfahrzeugtechnik und Strassenverkehr—Forschungsbilanz 1979—Reinfeneigenschaften und Fahrsicherheit—Entwicklung eines Luftdruckkontrollsystems fuer Fahrzeugreifen/-Fahrdynamik und Reifenkenndaten" (Lines of development in motor vehicle technology and road traffic—Research balance sheet 1979—Tire properties and safety in driving—Development of an air pressure control system for vehicle tires/Driving dynamics and tire characteristics), Verlag TUV Rheinland GmbH, Pages 1 to 8; German Pat. No. 3,004,493) employ in the diaphragm pressure cell, as the required value for the control of the tire pressure, a fixed trapped reference volume with a preset fixed reference pressure.

A disadvantageous feature of this system is that the required tire pressure value can only be set as a function of the intended travelling speed and the loading conditions. However, since various required values are necessary for the different vehicle types with their differing loading conditions and speed ranges, the known systems require the provision of a multiplicity of pressure switches with a reference pressure for each case. The objective of the invention is, therefore, to so extend the known tire pressure control system so that it can be employed universally and matched to the differing loading conditions and speed ranges. It is thus an object of the invention to provide a tire pressure control system having a valve with an air inlet opening located in a support body of a pressure switch, which air inlet opening, when the tire is being filled, is in connection, via a first valve seat, with the tire volume and, via a second valve seat effectively situated in series with the first, also in connection, via the filling connection, with a reference volume of a diaphragm pressure cell.

By this extension of the tire pressure control system, therefore, the reference pressure can be variably set, the tire pressure being simultaneously retained as the new reference pressure during the tire filling process.

It is another object of the invention to provide that after filling the tire, a first valve seat of the tire valve closes an air inlet opening, while a second valve seat of the valve still maintains a connection between a reference volume and the tire volume and then interrupts the connection after a time delay, in order to guarantee that a pressure difference between the tire pressure and the reference pressure, possibly occurring after the filling of the tire, can still be balanced out.

These and other objects, features and advantages of the present invention will become more apparent from the following description when taken in connection with the accompanying drawings which show, for the purposes of illustration only, one embodiment in accordance with the present invention, and wherein.

Figure 1:
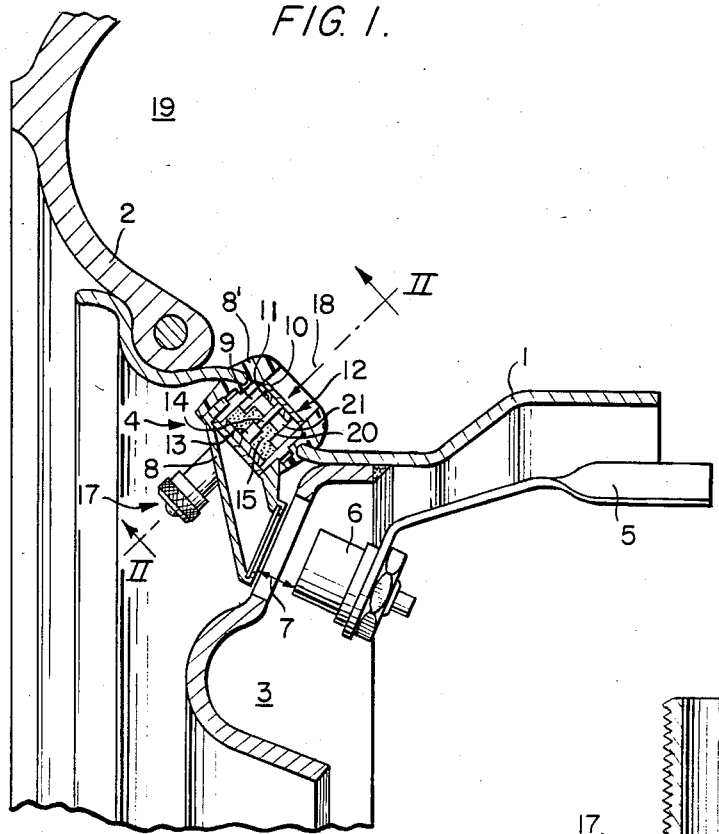
FIG. 1 shows a representation of the tire pressure control system with a pressure switch located on a rim and an HF transmitter located on a wheel web.

Referring now to the drawings wherein like reference numerals indicate like elements, and more particularly to FIG. 1, a pressure switch 4 is installed in the rim 1 of a vehicle wheel 3 provided with a tire 2 and a HF transmitter 6 with an output for downstream analysis electronics is installed in the wheel web 5 of the vehicle wheel 3. The arrangement of the pressure switch 4 and the HF transmitter 6 is so chosen that there is an air gap 7 between these two parts.

The pressure switch 4 consists of a support body 8 installed by means of a seal 8' in an opening of the rim 1, the support body having a holder 9, to which a membrane 10 is so fastened that the latter is stretched over a recess 11 of the holder 9 in order to form a diaphragm pressure cell 12. In addition, a movable contact pin 14, touching on one side the membrane 10 and on the other side a contact switch 13, is inserted in the holder 9, which contact pin 14 causes the contact switch 13 of a printed coil 15, which is also located in the holder 9 and is part of a tuned circuit, to open or close.

The recess 11 of the diaphragm pressure cell 12 is in turn connected via a filling connection 16, see FIG. 2, with a valve 17, preferably fixed in the support body 8, in the manner described in more detail below. Acting on one side of the membrane 10 of the pressure cell 12 is the tire pressure 18 of the tire volume 19 enclosed in the tire and, on the other side, the reference pressure 20 of the reference volume 21 enclosed in the diaphragm pressure cell 12. In the equilibrium condition of the two pressures 18 and 20, the contact switch 13 is closed so that, at each wheel revolution, the tuned circuit, comprising at least printed coil 15 of the pressure-switch 4 travelling past the HF transmitter 6 generates a pulse in the HF transmitter 6. The analysis electronics connected downstream of the HF transmitter 6 operates, for example, using a pulse comparison by axle. In a shift register, the information "fault", that is, pressure drop in the tire, cannot be shifted along by pulses of the opposite wheel as long as the controlled wheel itself resets the register by its pulses. If, however, these pulses do not occur, because the diaphragm 10 is actuated by an excessively low pressure 18 and, consequently, the switch 13 is opened, the shift register is no longer cancelled by the described reset. An error is then indicated.

Figure 2:
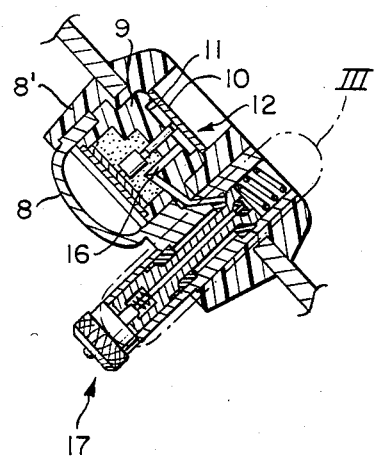
FIG. 2 shows a section II—II, from FIG. 1, through the pressure switch.

As described above, the diaphragm pressure cell 12 is connected, via a filling connection 16, to a valve 17, which is preferably integrated in the support body 8 of the pressure switch 4, see FIG. 2.

Figure 3:
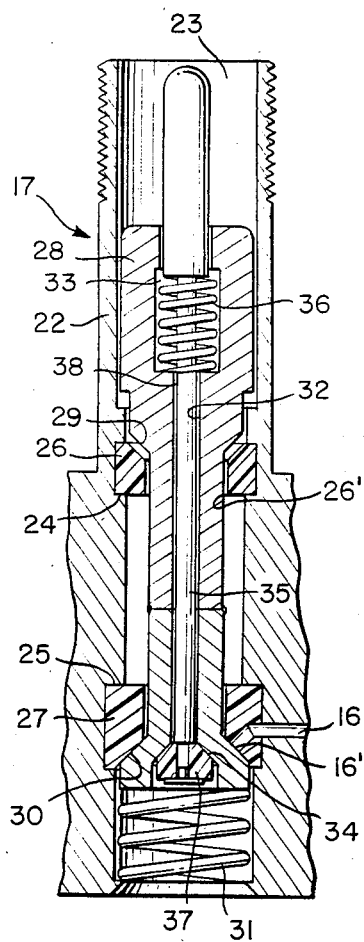
FIG. 3 shows the valve in enlarged representation of the detail "III" in FIG. 2.

The entry of the filling connection 16 into the valve 17 and its design can be seen from FIG. 3.

As shown in FIG. 3, the valve 17 consists of a housing 22 with an axial internal bore 23 having shoulders 24 and 25. An upper conical sealing ring 26 and a lower conical sealing ring 27 are placed on these shoulders 24, 25. An intermediate piston 28 is, in turn, displaceably supported in the bore 23, which intermediate piston 28 has conical shoulders 29 and 30 corresponding to the conical sealing rings 26 and 27 and is so shaped that with the intermediate piston 28 loaded upwards by means of an intermediate piston spring 31, the conical shoulder 29 is at a distance from the conical sealing ring 26, a third valve seat. The conical shoulder 30, which has a smaller external diameter than the internal bore 23, is in contact with the conical sealing ring 27, a second valve seat, and closes the opening 16' of the filling connection 16 entering through the conical sealing ring 27 into the internal bore 23 of the valve 17.

The intermediate piston 28 is, in turn, provided with an axial piston bore 32 which is widened at one end to a spring space 33 and at the other end to a conical shoulder 34. A filling piston 35, with smaller diameters in each case than the piston bore 32, is inserted in this piston bore 32. Filling piston 35, due to the force of a filling piston spring 36 located in the spring space 33, is under axial prestress in such a way that a conical sealing ring 37 located at one of ends of the filling piston 35 is in contact with the conical shoulder 34 of the intermediate piston 28, a first valve seat, and, by this means, closes the air entry opening 38 formed between the piston bore 32 and the filling piston 35. In addition, the upper conical sealing ring 26 is provided with a throttle lip 26', serving also as a dust protection lip for the second valve seat, in contact with the intermediate piston 28, which throttle lip 26' acts on the intermediate piston 28 so as to limit movement. With respect to the two springs 31 and 36, it should be noted that the intermediate piston spring 31 has a weaker spring characteristic than the filling piston spring 36.

The function of the tire pressure control system will now be described using FIG. 3.

If the air hose connection of an air filling device is placed on the housing 22 (FIG. 2) of the valve 17, the filling piston 35 is then moved downwards. Because of the weaker intermediate piston spring 31, the intermediate piston 28 is also pressed downwards, by means of the stronger filling piston spring 36, which is supported in the spring space 33 on the filling piston 35, on one side, and on the intermediate piston 28, on the other side, until the intermediate piston 28 is seated with its conical shoulder 29 on the upper conical sealing ring 26. Simultaneously, however, the conical shoulder 30 is unseated from the lower conical sealing ring 27, freeing the opening 16' of the filling connection 16 leading into the diaphragm pressure cell 12. The filling piston 35, however, continues to move downwards until the air hose connection of the air filling device is fully placed on the housing 22. During the further downward movement of the filling piston 35, the conical sealing ring 37 then rises off the conical shoulder 34 on the intermediate piston 28, so that the air inlet opening 38 is freed and air can flow into the tire when the air filling device is operated. Air can, however, simultaneously flow through the opening 16' via the filling connection 16 into the diaphragm pressure cell 12, in which a reference pressure is continually built up corresponding to the existing tire pressure. After the desired tire air pressure is attained, the air hose connection of the air filling device can be removed from the housing 22 of the valve 17 in the usual manner. When it is removed, the filling piston 35 is then abruptly pressed upwards by means of the stronger filling piston spring 36, so that the conical sealing ring 37 again comes in contact with the conical shoulder 34 and closes the air inlet opening 38. A possibly occurring pressure difference between the tire pressure and the reference pressure can, however, still balance out because the opening 16' is still open and is only closed with a time delay by the conical shoulder 30 of the intermediate piston 28, because the latter is pressed more slowly upwards due to the weaker intermediate piston spring 31 and the throttle lip 26', which acts to limit its movement, on the upper conical sealing ring 26. Due to the closing of the opening 16', however, the reference volume 21 is again trapped in the diaphragm pressure cell 12. The reference pressure in the reference volume is now equal to the air pressure in the tire.

By this means, the pressure selected for the tire is simultaneously retained as the new required value or reference pressure for the tire pressure control system.

While I have shown and described only one embodiment in accordance with the present invention, it is understood that the same is not limited thereto but is susceptible to numerous changes and modifications as known to one having ordinary skill in the art, and I therefore do not wish to be limited to the details shown and described herein, but intend to cover all such modifications as are encompassed by the scope of the appended claims.

I claim:

1. A tire pressure control system with a pressure switch assembly installed in a rim, which pressure switch, as part of a tuned circuit, damps, across an air gap, an HF transmitter, installed in a wheel web and having downstream analysis electronics, the pressure switch assembly comprising a support body having a diaphragm pressure cell with a reference pressure located in it and having a filling connection and the diaphragm of the pressure cell being subjected on one side to the reference pressure and on the other side to the tire pressure and being effectively connected to a contact switch which is part of the tuned circuit and is also located in the support body, further comprising a first valve means with an air inlet opening located in the support body of the pressure switch, which air inlet opening, when the tire is being filled, is in connection, via a first valve seat, with the tire volume and, via a second valve seat effectively in series with the first valve means, is also in connection, via the filling connection, with the reference volume of the diaphragm pressure cell.

2. A tire pressure control system according to claim 1, wherein
   after filling the tire, the first valve seat of the valve means closes the air inlet opening, while the second valve seat of the valve means still maintains a connection between the reference volume and the tire volume and then interrupts the connection with a time delay.

3. A tire pressure control system according to claim 2, wherein
   the first valve means opens and closes the opening of the filling connection of the diaphragm pressure cell.

4. A tire pressure control system according to claim 1, wherein
   the pressure switch assembly further comprises a housing with an internal bore, in which is guided an intermediate piston against the force of an intermediate piston spring and which forms a third valve seat against a sealing ring within the housing and
   a filling piston guided coaxially in the intermediate piston against the force of a filling piston spring, which filling piston forms a first valve seat against the intermediate piston.

5. A tire pressure control system according to claim 1, wherein
the second and a third valve seats are formed by conical shoulders on the intermediate piston and by conical sealing rings inserted in the internal bore in the housing and
the first valve seat is formed by a conical shoulder on the intermediate piston and a conical sealing ring of the filling piston.

6. A tire pressure control system according to claim 1, wherein
the air inlet opening extends axially between the piston bore of the intermediate piston and the filling piston.

7. A tire pressure control system according to claim 4, wherein
the spring characteristic of the filling piston spring is stronger than that of the intermediate piston spring.

8. A tire pressure control system according to claim 4, wherein
a time delay element for the closing of the second valve seat is formed by a throttle lip of the conical sealing ring, the throttle lip being in contact with the intermediate piston due to the characteristic of the intermediate piston spring.

9. A tire pressure control system according to claim 1, wherein
after filling the tire, the first valve seat of the valve means closes the air inlet opening, while the second valve seat of the valve means still maintains a connection between the reference volume and the tire volume and then interrupts the connection with a time delay, and the pressure switch assembly further comprises a housing with an internal bore, in which is guided an intermediate piston against the force of an intermediate piston spring and which forms a third valve seat against a sealing ring within the housing and
a filling piston guided coaxially in the intermediate piston against the force of a filling piston spring, which filling piston forms a first valve seat against the intermediate piston.

10. A tire pressure control system according to claim 2, wherein
the first valve means opens and closes the opening of the filling connection of the diaphragm pressure cell, and
the pressure switch assembly further comprises a housing with an internal bore, in which is guided an intermediate piston against the force of an intermediate piston spring and which forms a third valve seat against a sealing ring within the housing and
a filling piston guided coaxially in the intermediate piston against the force of a filling piston spring, which filling piston forms a first valve seat against the intermediate piston.

11. A tire pressure control system according to claim 1, wherein
after filling the tire, the first valve seat of the valve means closes the air inlet opening, while the second valve seat of the valve means still maintains a connection between the reference volume and the tire volume and then interrupts the connection with a time delay,
the second and a third valve seats are formed by conical shoulders on the intermediate piston and by conical sealing rings inserted in the internal bore in the housing and
the first valve seat is formed by a conical shoulder on the intermediate piston and a conical sealing ring of the filling piston.

12. A tire pressure control system according to claim 2, wherein
the first valve means opens and closes the opening of the filling connection of the diaphragm pressure cell, which filling connection opens into the valve means, and
the second and a third valve seats are formed by conical shoulders on the intermediate piston and by conical sealing rings inserted in the internal bore in the housing, and
the first valve seat is formed by a conical shoulder on the intermediate piston and a conical sealing ring of the filling piston.

13. A tire pressure control system according to claim 1, wherein
the pressure switch assembly further comprises a housing with an internal bore, in which is guided an intermediate piston against the force of an intermediate piston spring and which forms a third valve seat against a sealing ring within the housing and
a filling piston guided coaxially in the intermediate piston against the force of a filling piston spring, which filling piston forms a first valve seat against the intermediate piston,
the second and a third valve seats are formed by conical shoulders on the intermediate piston and by conical sealing rings inserted in the internal bore in the housing and
the first valve seat is formed by a conical shoulder on the intermediate piston and a conical sealing ring of the filling piston.

14. A tire pressure control system according to claim 1, wherein
after filling the tire, the first valve seat of the valve means closes the air inlet opening, while the second valve seat of the valve means still maintains a connection between the reference volume and the tire volume and then interrupts the connection with a time delay and
the air inlet opening extends axially between the piston bore of the intermediate piston and the filling piston.

15. A tire pressure control system according to claim 1, wherein
the pressure switch assembly further comprises a housing with an internal bore, in which is guided an intermediate piston against the force of an intermediate piston spring and which forms a third valve seat against a sealing ring within the housing and
a filling piston guided coaxially in the intermediate piston against the force of a filling piston spring, which filling piston forms a first valve seat against the intermediate piston and
the air inlet opening extends axially between the piston bore of the intermediate piston and the filling piston.

16. A tire pressure control system for a vehicle wheel having a rim and tire comprising
a pressure switch means mounted in the rim for sensing pressure in the volume of the tire and comprising a diaphragm, a first side of which is exposed to pressure in the tire volume and a second side of which is exposed to a reference air pressure in a diaphragm pressure cell and a coil means positioned in response to the pressure in the tire volume, means for filling the tire to a predetermined pressure and, means comprising an air inlet opening connected to the reference volume for establishing the reference pressure in the reference volume equal to the pressure in the tire volume in response to actuation of the means for filling.

17. A tire pressure control system according to claim 16, wherein the means for establishing the reference pressure further comprises means for preventing communication between the pressure in the tire volume and the reference pressure in the diaphragm pressure cell after a time delay following deactivation of said means for filling.

18. A tire pressure control system for a vehicle wheel having a rim and tire comprising a pressure switch means mounted in the rim for sensing pressure in the volume of the tire and comprising a diaphragm, a first side of which is exposed to pressure in the tire volume and a second side of which is exposed to a reference pressure in a diaphragm pressure cell and a coil means positioned in response to the pressure in the tire volume, means for performing one of communicating the pressure of the diaphragm pressure cell with the pressure in the tire volume prior to filling of the tire and ceasing said communicating between the pressure of the tire volume and the pressure of the diaphragm pressure cell subsequent to tire filling, and means for performing one of filling the tire subsequent to actuation of the means for communicating and ceasing filling of the tire prior to ceasing said communicating between the tire pressure of the tire volume and the pressure of the diaphragm reference cell.

* * * * *